United States Patent [19]

Akagi et al.

[11] Patent Number: 5,036,663
[45] Date of Patent: Aug. 6, 1991

[54] AIR SUPPLY CONTROL SYSTEMS FOR INTERNAL COMBUSTION ENGINES

[75] Inventors: Toshimichi Akagi, Hiroshima; Haruo Okimoto, Aki; Yasushi Niwa, Higashihiroshima; Seiji Tashima, Aki, all of Japan

[73] Assignee: Mazda Motor Corporation, Shinchi, Japan

[21] Appl. No.: 467,497

[22] Filed: Jan. 19, 1990

[30] Foreign Application Priority Data

Jan. 20, 1989 [JP] Japan .................................. 1-12676

[51] Int. Cl.$^5$ ............................................ F02B 37/12
[52] U.S. Cl. ...................................... 60/612; 60/600; 60/602
[58] Field of Search ................. 60/612, 600, 601, 602, 60/603

[56] References Cited

FOREIGN PATENT DOCUMENTS

56-41417 4/1981 Japan .
59-160022 9/1984 Japan .

Primary Examiner—Leonard E. Smith
Assistant Examiner—Peter Korytnyk
Attorney, Agent, or Firm—Sixbey, Friedman, Leedom & Ferguson

[57] ABSTRACT

An air supply control system for an internal combustion engine comprises first and second turbosuperchargers, an exhaust cutoff valve operative to open and close one of separated exhaust passages in which a turbine of the second turbosupercharger is disposed, a first valve driving device for controlling the exhaust cutoff valve so that only the first turbosupercharger works when intake air mass flow fed to the engine is to be relatively small and both of the first and second turbosuperchargers work when the intake air mass flow is to be relatively large, an exhaust bypass valve operative to open and close an exhaust bypass passage provided for forming a partial exhaust passage detouring the exhaust cutoff valve, a second valve driving device for causing the exhaust bypass valve to open the exhaust bypass passage when intake air pressure applied to the engine reaches a predetermined value under a condition in which the intake air mass flow is to be relatively small, a waste gate valve operative to open and close a bypass passage provided for forming a partial exhaust passage detouring the turbines of the first and second turbosuperchargers, and a third valve driving device for causing the waste gate valve to open the bypass passage when the pressure of intake air reaches substantially the predetermined value under a condition in which the intake air mass flow is to be relatively large.

7 Claims, 8 Drawing Sheets

AIR SUPPLY CONTROL SYSTEMS FOR INTERNAL COMBUSTION ENGINES

BACKGROUND OF THE INVENTION

1. Field of the Invention

The present invention relates generally to air supply control systems for internal combustion engines, and more particularly to a system for controlling air supply effected to an internal combustion engine by a plurality of turbosuperchargers accompanying with the internal combustion engine.

2. Description of the Prior Art

In the field of internal combustion engines employed in vehicles, there has been proposed a so-called sequentially controlled supercharging system in which a couple of turbosuperchargers of primary and secondary are provided for an internal combustion engine and so controlled that only the primary turbosupercharger works for supercharging the engine when intake air mass flow in an intake passage of the engine is relatively small and both the primary and the secondary turbosuperchargers work simultaneously for supercharging the engine when the intake air mass flow is relatively large, as disclosed in, for example, the Japanese patent applications published before examination under publication numbers 56-41417 and 59-160022. In such a system, an exhaust cutoff valve is disposed in a portion of an exhaust passage of the engine through which exhaust gas is applied to a turbine of the secondary turbosupercharger and an intake air cutoff valve is also disposed in a portion of the intake passage of the engine through which air compressed by a compressor of the secondary turbosupercharger is supplied to a combustion chamber of the engine, and each of the exhaust cutoff valve and the intake cutoff valve is controlled to be closed and open so as to cause the primary and secondary turbosuperchargers to work in the aforementioned manner.

In connection with the control in operation of the primary and secondary turbosuperchargers, it has been proposed to put the secondary turbosupercharger in a condition of preliminary rotation before the secondary turbosupercharger commences to work for supercharging the engine for the purpose of suppressing torque shock arising on the engine due to time lag in the starting characteristic of the secondary turbosupercharger. In such a case, it has been usual that the preliminary rotation of the secondary turbosupercharger is caused by such a control as to open the exhaust cutoff valve for supplying the turbine of the secondary turbosupercharger with the exhaust gas under a condition in which an intake air relief valve which is provided in a bypass provided to the intake passage for detouring the secondary turbosupercharger is opened.

However, the preliminary rotation of the secondary turbosupercharger thus caused in the manner proposed previously brings about a disadvantage that the primary turbosupercharger is undesirably reduced in its speed of rotation because the exhaust gas branches through the exhaust cutoff valve which is opened under the condition in which the intake air relief valve is opened and thereby the exhaust gas supplied to a turbine of the primary turbosupercharger is reduced and this compels the preliminary rotation of the secondary turbosupercharger to be conducted insufficiently for a relatively short period of time just before the secondary turbosupercharger commences to work for supercharging the engine. Accordingly, in the case where the preliminary rotation of the secondary turbosupercharger is conducted in the manner proposed previously, it is difficult to put the secondary turbosupercharger in a condition of sufficiently high preliminary rotation before the secondary turbosupercharger commences to work for supercharging the engine, and therefore the torque shock arising on the engine is not sufficiently reduced when the secondary turbosupercharger commences to work for supercharging the engine.

In view of the above, it has been also proposed to provide an exhaust bypass valve disposed at a portion of the exhaust passage of the engine for introducing therethrough a relatively small quantity of exhaust gas to a portion of the exhaust passage downstream to the exhaust cutoff valve from a portion of the exhaust passage upstream to the exhaust cutoff valve, so that the turbine of the secondary turbosupercharger is driven to rotate by the exhaust gas passing through the exhaust bypass valve and thereby the secondary turbosupercharger is subjected to its preliminary rotation under a condition in which the exhaust cutoff valve is in its closed state. In the case where such an exhaust bypass valve as mentioned above is used, the intake air relief valve is caused to close on or before a time point at which the exhaust cutoff valve is opened and the preliminary rotation of the secondary turbosupercharger continues until the intake air relief valve is closed, and therefore the secondary turbosupercharger is put in a condition of sufficiently high preliminary rotation caused by the relatively small exhaust gas passing through the exhaust bypass valve just before the exhaust cutoff valve is opened. When the exhaust cutoff valve is opened, the intake air cutoff valve is also opened and the secondary turbosupercharger under the sufficiently high preliminary rotation commences to work for supercharging the engine under a condition in which the intake air relief valve is closed. Consequently, the torque shock arising on the engine is surely suppressed when the second supercharger commences to work for supercharging the engine.

In the meantime, the internal combustion engine equipped with a turbosupercharger is usually provided with a waste gate valve which is operative to prevent compressed air pressure in an intake passage of the engine from exceeding a predetermined value. The waste gate valve is disposed in a bypass passage detouring a turbine of the turbosupercharger and opened for reducing exhaust gas flowing through the turbine of the turbosupercharger when the compressed air pressure in the intake passage reaches the predetermined value.

In the case of an internal combustion engine to which the sequentially controlled supercharging system wherein the primary and secondary turbosuperchargers are provided as aforementioned and both the exhaust bypass valve and waste gate valve are used for controlling exhaust gas flow supplied to the primary and secondary turbosuperchargers is applied, the exhaust gas flowing through the exhaust bypass valve dose not contribute to increase in compressed air pressure in the intake passage but causes the secondary turbosupercharger to be subjected to its preliminary rotation prior to supercharging operation and therefore the exhaust bypass valve functions substantially to limit the compressed air pressure in the intake passage as well as the waste gate valve when only the primary turbosupercharger works for supercharging the engine and, on the other hand, the compressed air pressure in the intake passage is limited by only the waste gate valve when both the primary and secondary turbosuperchargers work simultaneously for supercharging the engine. This results in a fear that the maximum value of the compressed air pressure in the intake passage limited by the exhaust bypass valve is different from the maximum value of the compressed air pressure in the intake passage limited by the waste gate valve and therefore the compressed air pressure in the intake passage has its maximum value which varies suddenly and undesirably so as to hinder the engine from operating stably when the secondary turbosupercharger commences to work for supercharging the engine in addition to the primary turbosupercharger or the secondary turbosupercharger ceases to work for supercharging the engine.

OBJECTS AND SUMMARY OF THE INVENTION

Accordingly, it is an object of the present invention is to provide an air supply control system for an internal combustion engine, which includes a first turbosupercharger, a second turbosupercharger operative to work in addition to the first supercharger when intake air mass flow fed to the engine is to be relatively large, an exhaust valve for controlling exhaust gas flow supplied to the second turbosupercharger and a waste gate valve for controlling exhaust gas flow supplied to both the first and second turbosuperchargers, and avoids the foregoing disadvantages and problems encountered with the prior art.

Another object of the present invention is to provide an air supply control system for an internal combustion engine, which includes a first turbosupercharger, a second turbosupercharger operative to work in addition to the first supercharger when intake air mass flow fed to the engine is to be relatively large, an exhaust bypass valve for controlling exhaust gas flow supplied to the second turbosupercharger and a waste gate valve for controlling exhaust gas flow supplied to both the first and second turbosuperchargers, and by which intake air supplied to the engine is compressed to have its maximum pressure which is prevented from varying suddenly when the second turbosupercharger commences to work for supercharging the engine in addition to the first turbosupercharger or the second turbosupercharger ceases to work for supercharging the engine.

A further object of the present invention is to provide an air supply control system for an internal combustion engine, which includes a first turbosupercharger, a second turbosupercharger operative to work in addition to the first supercharger when intake air mass flow fed to the engine is to be relatively large, an exhaust bypass valve for controlling exhaust gas flow supplied to the second turbosupercharger and a waste gate valve for controlling exhaust gas flow supplied to both the first and second turbosuperchargers, and in which each of the exhaust bypass valve and waste gate valve operates to limit pressure of intake air applied to the engine in such a manner that the intake air has its maximum pressure which is prevented from varying suddenly when the second turbosupercharger commences to work for supercharging the engine in addition to the first turbosupercharger or the second turbosupercharger ceases to work for supercharging the engine.

According to the present invention, there is provided an air supply control system for an internal combustion engine comprising a first turbosupercharger having a turbine disposed in a first separated exhaust passage extending from the engine and a compressor disposed in a first separated intake passage connected to the engine, a second turbosupercharger having a turbine disposed in a second separated exhaust passage extending from the engine and a compressor disposed in a second separated intake passage connected to the engine, an exhaust cutoff valve operative selectively to be open and closed respectively for opening and closing the second separated exhaust passage in which the turbine of the second turbosupercharger is disposed, a first valve driving device operative to cause the exhaust cutoff valve to be closed so that the first turbosupercharger works for supercharging the engine but the second turbosupercharger is restrained from supercharging the engine when intake air mass flow fed to the engine is to be relatively small and to cause the exhaust cutoff valve to be open so that both of the first and second turbosuperchargers work simultaneously for supercharging the engine when the intake air mass flow fed to the engine is to be relatively large, an exhaust bypass valve operative selectively to be open and closed respectively for opening and closing an exhaust bypass passage provided to the second separated exhaust passage for forming a first partial exhaust passage detouring the exhaust cutoff valve, a second valve driving device operative to cause the exhaust bypass valve to be open so that a relatively small exhaust gas flow is supplied through the exhaust bypass passage to the turbine of the second turbosupercharger when pressure of intake air applied to the engine reaches a predetermined value under a condition in which the intake air mass flow fed to the engine is to be relatively small, a waste gate valve operative selectively to be open and closed respectively for opening and closing a bypass passage provided in common to the first and second separated exhaust passages for forming a second partial exhaust passage detouring the turbines of the first and second turbosuperchargers, and a third valve driving device operative to cause the waste gate valve to be open so that a part of exhaust gas from the engine flows through the bypass passage without passing through the turbines of the first and second turbosuperchargers to prevent the pressure of intake air applied to the engine from increasing when the pressure of intake air applied to the engine reaches substantially the predetermined value under a condition in which the intake air mass flow fed to the engine is to be relatively large.

In the air supply control system thus constituted in accordance with the present invention, when the intake air mass flow fed to the engine is to be relatively small, the exhaust cutoff valve is kept closed by the first valve driving device so that only the first turbosupercharger works for supercharging the engine. In such a condition, when the pressure of intake air applied to the engine reaches the predetermined value, the exhaust bypass valve is opened by the second valve driving device and thereby the relatively small exhaust gas flow is supplied through the exhaust bypass passage to the turbine of the second supercharger, so that the second turbosupercharger is subjected to its preliminary rotation before it commences to work for supercharging the engine. During the preliminary rotation of the second supercharger, the pressure of intake air applied to the engine is not increased substantially. This means that the exhaust bypass valve functions to limit the pressure of intake air applied to the engine to the predetermined value when the intake air mass flow fed to the engine is to be relatively small. After that, when the intake air mass flow fed to the engine is to be relatively large, the exhaust cutoff valve is opened by the first valve driving device so that the second turbosupercharger, which has been put in a condition of sufficiently high preliminary rotation, commences to work for supercharging the engine in addition to the first turbosupercharger. Then, with the pressure of intake air applied to the engine having substantially the predetermined value under a condition in which the first and second turbosuperchargers work simultaneously for supercharging the engine, the waste gate valve is opened by the third valve driving device and thereby a part of exhaust gas from the engine flows through the bypass passage without passing through the turbines of the first and second turbosuperchargers to prevent the pressure of intake air applied to the engine from increasing. That is, the waste gate valve is operative to limit the pressure of intake air applied to the engine to the predetermined value when the intake air mass flow fed to the engine is to be relatively large.

In the operation described above, each of the exhaust bypass valve and waste gate valve responds to the pressure of intake air applied to the engine so as to limit the pressure of intake air applied to the engine to substantially the same predetermined value and therefore the intake air supplied to the engine is compressed to have its maximum pressure which is prevented from varying suddenly when the second turbosupercharger commences to work for supercharging the engine in addition to the first turbosupercharger or the second turbosupercharger ceases to work for supercharging the engine. Consequently, the engine is kept in its stable operation regardless of commencement or termination of supercharging by the second turbosupercharger.

The above, and other objects, features and advantages of the present invention will become apparent from the following detailed description which is to be read in conjunction with the accompanying drawings.

BRIEF DESCRIPTION OF THE DRAWINGS

FIGS. 8-a, 8-b and 8-c show a flow chart used for explaining the operation of the embodiment shown in FIG. 2.

DESCRIPTION OF THE PREFERRED EMBODIMENTS

Figure 1:
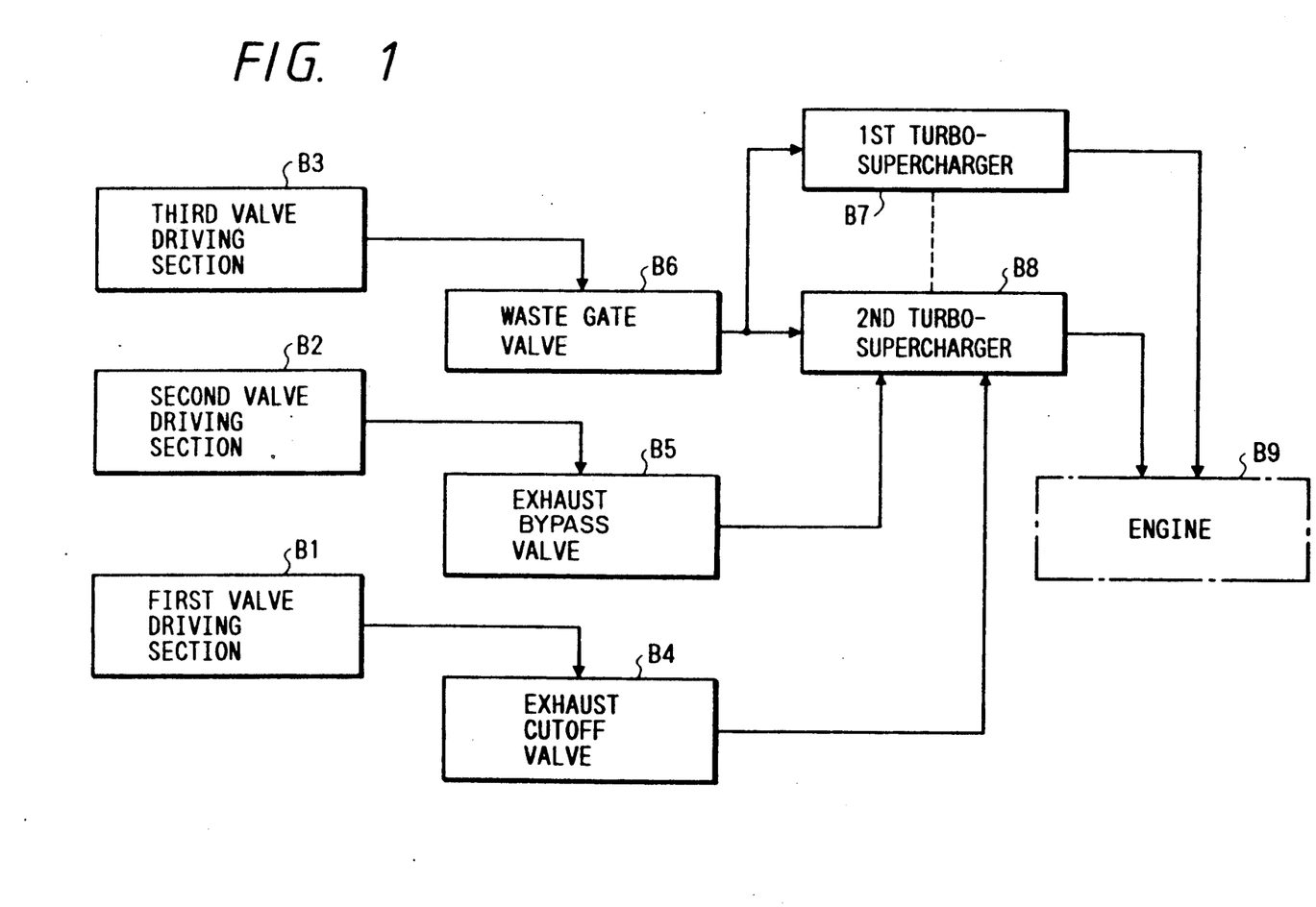
FIG. 1 is a block diagram illustrating the basic arrangement of an air supply control system for an internal combustion engine according to the present invention.

FIG. 1 illustrates a functional block diagram of a system incorporating the present invention. In the functional block diagram of FIG. 1, the system comprises a first valve driving section B1, a second valve driving section B2, a third valve driving section B3, an exhaust cutoff valve B4, an exhaust bypass valve B5, a waste gate valve B6, a first turbosupercharger B7 and a second turbosupercharger B8, and the first and second superchargers B7 and B8 are connected with an engine B9 to which the system is applied.

The first turbosupercharger B7 has a turbine disposed in a first separated exhaust passage extending from the engine B9 and a compressor disposed in a first separated intake passage connected to the engine B9 and the second turbosupercharger B8 has a turbine disposed in a second separated exhaust passage extending from the engine B9 and a compressor disposed in a second separated intake passage connected to the engine B9. The exhaust cutoff valve B4 is operative selectively to be open and closed respectively for opening and closing the second separated exhaust passage in which the turbine of the second turbosupercharger B8 is disposed. The exhaust bypass valve B5 is operative selectively to be open and closed respectively for opening and closing an exhaust bypass passage which is provided to the second separated exhaust passage, in which the turbine of the second turbosupercharger B8 is disposed, for forming a first partial exhaust passage detouring the exhaust cutoff valve B4. The waste gate valve B6 is operative selectively to be open and closed respectively for opening and closing a second bypass passage provided in common to the first and second separate exhaust passages, in which the turbines of the first and second turbosuperchargers B7 and B8 are disposed respectively, for forming a second partial exhaust passage detouring the turbines of the first and second turbosuperchargers B7 and B8.

The first valve driving section B1 is operative to cause the exhaust cutoff valve B4 to be closed so that the first turbosupercharger B7 works for supercharging the engine B9 but the second turbosupercharger B8 is restrained from supercharging the engine B9 when intake air mass flow fed to the engine B9 is to be relatively small and to cause the exhaust cutoff valve B4 to be open so that both of the first and second turbosuperchargers B7 and B8 work simultaneously for supercharging the engine B9 when the intake air mass flow fed to the engine B9 is to be relatively large. The second valve driving section B2 is operative to cause the exhaust bypass valve B5 to be open so that a relatively small exhaust gas flow is supplied through the exhaust bypass passage to the turbine of the second turbosupercharger B8 when pressure of intake air applied to the engine B9 reaches a predetermined value under a condition in which the intake air mass flow fed to the engine B9 is to be relatively small. The third valve driving section B3 is operative to cause the waste gate valve B6 to be open so that a part of exhaust gas from the engine B9 flows through the bypass passage without passing through the turbines of the first and second turbosuperchargers B7 and B8 to prevent the pressure of intake air applied to the engine B9 from increasing when the pressure of intake air applied to the engine B9 reaches substantially the predetermined value under a condition in which the intake air mass flow fed to the engine B9 is to be relatively large.

Figure 2:
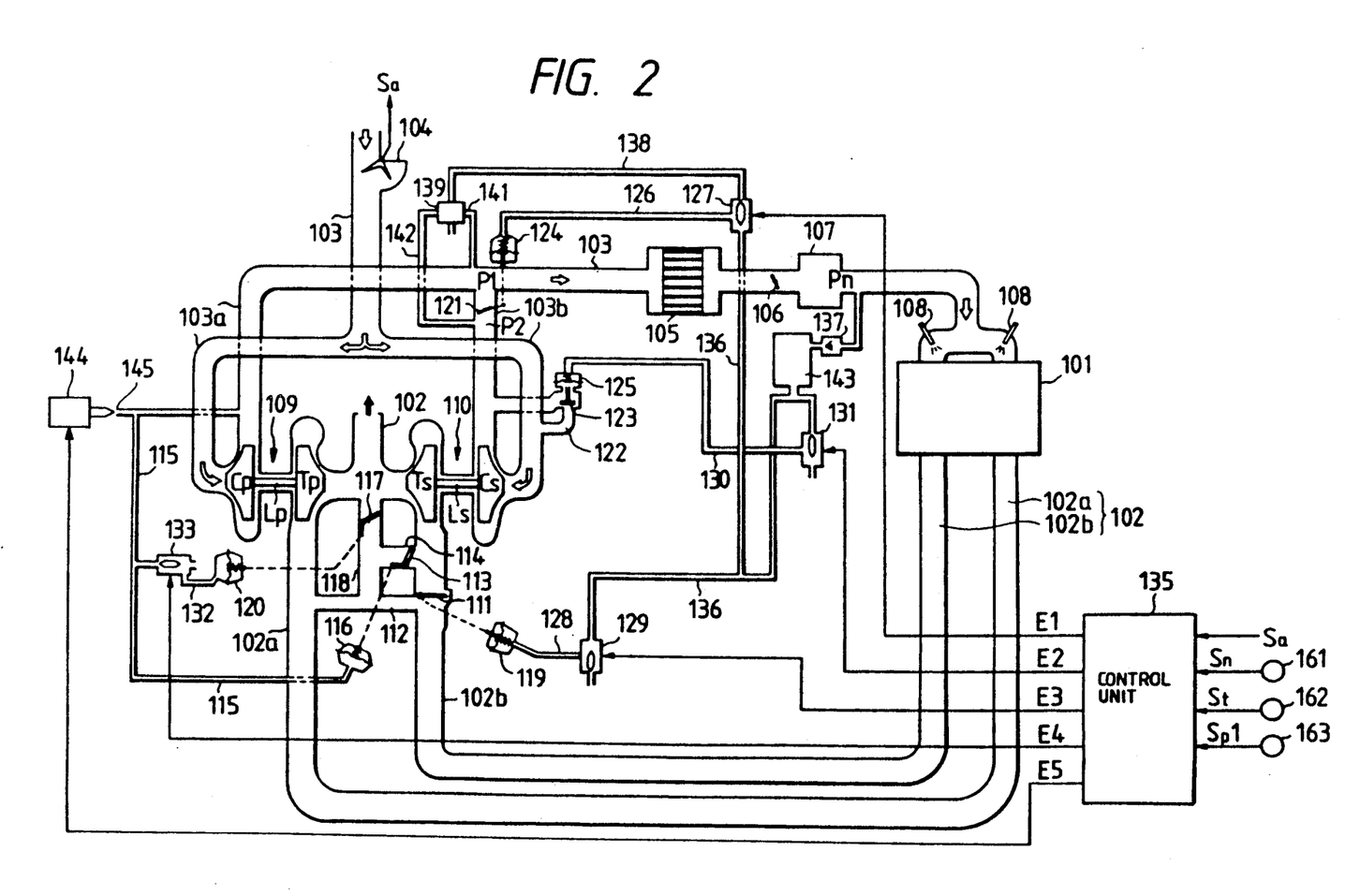
FIG. 2 is a schematic illustration showing an embodiment of air supply control system for an internal combustion engine according to the present invention, together with essential parts of an engine to which the embodiment is applied.

FIG. 2 illustrates a first embodiment of air supply control system according to the present invention, together with a part of an engine to which the first embodiment is applied.

Referring to FIG. 2, an internal combustion engine 101, which is, for example, a rotary engine having a couple of rotors each forming an operating chamber having the capacity of, for example, 654 cubic centimeters, is provided with an exhaust passage 102 for discharging exhaust gas from the engine 101 and an intake passage 103 for supplying the engine 101 with intake air. The exhaust passage 102 includes first and second separated exhaust passages 102a and 102b, and the intake passage 103 includes first and second branched intake passages 103a and 103b which are separated from each other at a location downstream to an air flow sensor 104 provided for detecting intake air mass flow in the intake passage 103 and merged into each other at a location upstream to an intercooler 105 provided for cooling the intake air in the intake passage 103. A portion of the intake passage 103 downstream to the intercooler 105 is provided with a throttle valve 106, a surge chamber 107 and fuel injectors 108.

A primary turbosupercharger 109 is provided with a turbine Tp disposed in the first separated exhaust passage 102a to be driven to rotate by the exhaust gas and a compressor Cp disposed in the first branched intake passage 103a and coupled through a rotating shaft Lp with the turbine Tp. A secondary turbosupercharger 110 is also provided with a turbine Ts disposed in the second separated exhaust passage 102b to be driven to rotate by the exhaust gas and a compressor Cs disposed in the second branched intake passage 103b and coupled through a rotating shaft Ls with the turbine Ts.

A portion of the first branched intake passage 103a upstream to the compressor Cp and a portion of the second branched intake passage 103b upstream to the compressor Cs are arranged in a line to form a branched portion, so that pressure waves produced in one of the first and second branched intake passages 103a and 103b propagates easily to the other of the first and second branched intake passages 103a and 103b but hardly toward the air flow sensor 104.

An exhaust cutoff valve 111 is disposed in a portion of the second separated exhaust passage 102b upstream to the turbine Ts. This exhaust cutoff valve 111 is operative to close the second separated exhaust passage 102b in order to prevent the exhaust gas from being supplied to the turbine Ts so that only the primary turbosupercharger 109 works in a situation where intake air mass flow supplied to the engine 101 is to be relatively small.

A portion of the second separated exhaust passage 102b upstream to the exhaust cutoff valve 111 is connected through a connecting passage 112 with a portion of the first separated exhaust passage 102a upstream to the turbine Tp. The connecting passage 112 is also connected with a portion of the exhaust passage 102 downstream to the turbines Tp and Ts through a bypass passage 118 in which a waste gate valve 117 is provided. The bypass passage 118 forms, together with the connecting passage 112, a partial exhaust passage detouring the turbines Tp and Ts of the primary and secondary turbosuperchargers 109 and 110. A portion of the bypass passage 118 upstream to the waste gate valve 117 is connected with a portion of the second separated exhaust passage 102b between the exhaust cutoff valve 111 and the turbine Ts through an exhaust bypass passage 114 in which an exhaust bypass valve 113 is provided. The exhaust bypass passage 114 forms, together with portions of the connecting passage 112 and bypass passage 118, a partial exhaust passage detouring the exhaust cutoff valve 111.

The waste gate valve 117 is driven by a diaphragm actuator 120 and a pressure chamber of the diaphragm actuator 120, in which a spring for biasing the waste gate valve 117 to be closed is contained, is coupled, through a control pressure pipe 132, a three-way solenoid valve 133 having its output port connected to the control pressure pipe 132 and a control pressure pipe 115 to which one of input ports of the three-way solenoid valve 133 is connected, with a portion of the first branched intake passage 103a downstream to the compressor Cp. The exhaust bypass valve 113 is driven by a diaphragm actuator 116 and a pressure chamber of the diaphragm actuator 116, in which a spring for biasing the exhaust bypass valve 113 to be closed is contained, is coupled through the control pressure pipe 115 with the portion of the first branched intake passage 103a downstream to the compressor Cp. The control pressure pipe 115 is provided with an opening 145 which is controlled to be open and closed by a solenoid valve 144.

An intake air cutoff valve 121 is disposed in a portion of the second branched intake passage 103b downstream to the compressor Cs. The second branched intake passage 103b is provided also with an intake air relief passage 122 detouring the turbine Ts and having therein an intake air relief valve 123. The intake air cutoff valve 121 is driven by a diaphragm actuator 124, and the intake air relief valve 123 is driven by a diaphragm actuator 125.

A control pressure pipe 126 extending from the diaphragm actuator 124 for driving the intake air cutoff valve 121 is connected with an output port of a three-way solenoid valve 127, and a control pressure pipe 128 extending from a diaphragm actuator 119 for driving the exhaust cutoff valve 111 is connected with an output port of a three-way solenoid valve 129. Further, a control pressure pipe 130 extending from the diaphragm actuator 125 for driving the intake air relief valve 123 is connected with an output port of a three-way solenoid valve 131.

The above mentioned three-way solenoid valves 127, 129, 131 and 133 and the solenoid valve 144 are controlled by a control unit 135 constituted by a microcomputer.

The control unit 135 is provided with detection output signals Sa, Sn, St and Sp1 obtained from the air flow sensor 104, an engine speed sensor 161 for detecting the engine speed, a throttle sensor 162 for detecting opening degree of the throttle valve 106 (opening degree of throttle), and an air pressure sensor 163 for detecting air pressure P1 at a position downstream to the compressor Cp in the first branched intake passage 103a, that is, compressed air pressure applied to the engine 101, respectively, and operative to produce control signals E1 to E5 selectively based on the detection output signals Sa, Sn, St and Sp1 and to supply the three-way solenoid valve 127 with the control signal E1, the three-way solenoid valve 131 with the control signal E2, the three-way solenoid valve 129 with the control signal E3, the three-way solenoid valve 133 with the control signal E4, and the solenoid valve 144 with the control signal E5.

One of input ports of the three-way solenoid valve 129 is open to the atmosphere and the other of the input ports is connected through a pipe 136 with a negative pressure tank 143 to which negative pressure Pn at a portion downstream to the throttle valve 106 in the intake passage 103 is supplied through a check valve 137. One of input ports of the three-way solenoid valve 131 is open to the atmosphere and the other of the input ports is connected with the negative pressure tank 143. Further, one of input ports of the three-way solenoid valve 127 is connected through the pipe 136 with the negative pressure tank 143 and the other of the input ports is connected through a pipe 138 with a pressure difference detecting valve 139.

Figure 3:
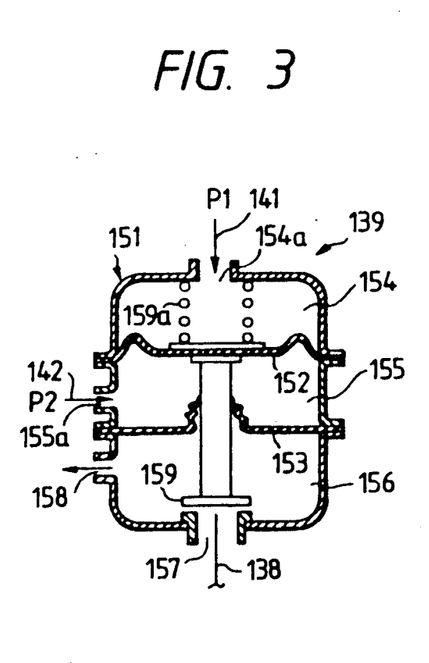
FIG. 3 is a schematic illustration showing a pressure difference detecting valve employed in the embodiment shown in FIG. 2.

As shown in FIG. 3, the pressure difference detecting valve 139 has a housing 151 in which three chambers 154, 155 and 156 are formed with diaphragms 152 and 153. The chambers 154 and 155 are provided with input ports 154a and 155a, respectively, and the chamber 156 is provided with an open port 158 and an output port 157 connected with the pipe 138. The input port 154a is connected through a pipe 141 with the portion of the first branched intake passage 103a downstream to the compressor Cp so as to be supplied with the air pressure P1, and the input port 155a is connected through a pipe 142 with a portion of the second branched intake passage 103b upstream to the intake air cutoff valve 121 so as to be supplied with air pressure P2 at a position upstream to the intake air cutoff valve 121 in the second branched intake passage 103b.

The pressure difference detecting valve 139 is provided further with a valve body 159 connected with the diaphragms 152 and 153 and biased by a spring 159a disposed in the chamber 154. This valve body 159 is operative to keep the output port 157 open so as to open the chamber 156 to the atmosphere when a pressure difference between the air pressures P1 and P2 is relatively large and keep the output port 157 closed when the pressure difference between the air pressures P1 and P2 is equal to or smaller than a predetermined pressure value ΔP. Accordingly, when the control pressure pipe 126 is communicated with the pipe 138 through the three-way solenoid valve 127 controlled by the control signal E1 and the pressure difference between the air pressures P1 and P2 is larger than the predetermined pressure value ΔP, the diaphragm actuator 124 is opened to the atmosphere and thereby the intake air cutoff valve 121 is opened. On the other hand, when the control pressure pipe 126 is communicated with the pipe 136 through the three-way solenoid valve 127 controlled by the control signal E1, the negative pressure is applied to the diaphragm actuator 124 and thereby the intake air cutoff valve 121 is closed.

When the control pressure pipe 128 is communicated with the pipe 136 through the three-way solenoid valve 129 controlled by the control signal E3, the negative pressure is applied to the diaphragm actuator 119 and thereby the exhaust cutoff valve 111 is closed, so that only the primary turbosupercharger 109 is caused to work. On the other hand, when the control pressure pipe 128 is opened to the atmosphere through the three-way solenoid valve 129 controlled by the control signal E3, the exhaust cutoff valve 111 is opened, so that the secondary turbosupercharger 110 is caused to work in addition to the primary turbosupercharger 109.

Figure 4:
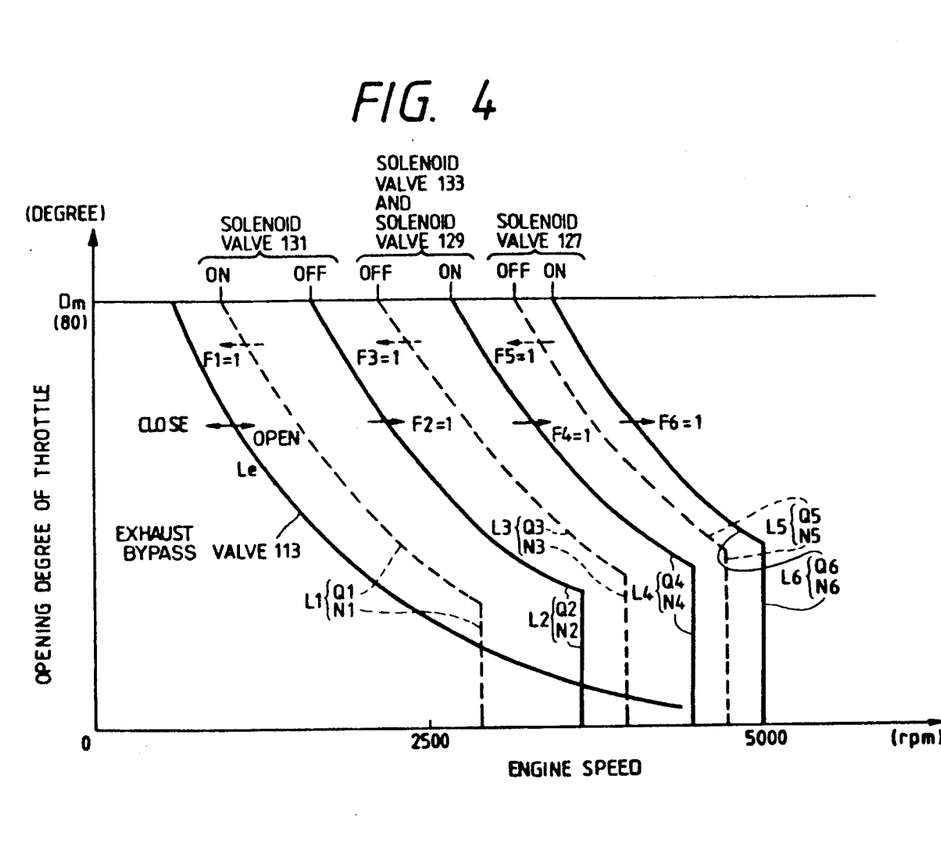
FIGS. 4, 5 and 6 are characteristic charts used for explaining the operation of various valves employed in the embodiment shown in FIG. 2.

FIG. 4 is a characteristic chart showing the operating conditions of the exhaust cutoff valve 111, exhaust bypass valve 113, waste gate valve 117, intake air cutoff valve 121 and intake air relief valve 123. This characteristic chart of FIG. 4 has an axis of abscissa representing engine speed and an axis of ordinate representing engine load embodied by opening degree of throttle, the maximum value of which is indicated by Dm, and is stored in the form of data map in a memory contained in the control unit 135.

According to the characteristic chart of FIG. 4, the exhaust bypass valve 113 is changed to be open from closed and to be closed from open in accordance with a line Le in common. On the other hand, the three-way solenoid valve 131 is changed into the ON state from the OFF state for causing the intake air relief valve 123 to be open from closed in accordance with a line L1 which indicates the operating condition of engine in which the engine 101 operates with intake air mass flow Q1 and the operating condition of engine in which the engine 101 operates at engine speed N1 and into the OFF state from the ON state for causing the intake air relief valve 123 to be closed from open in accordance with a line L2 which indicates the operating condition of engine in which the engine 101 operates with intake air mass flow Q2 and the operating condition of engine in which the engine 101 operates at engine speed N2, the three-way solenoid valves 129 and 133 are changed into the OFF state from the ON state for causing respectively the exhaust cutoff valve 111 and waste gate valve 117 to be closed from open in accordance with a line L3 which indicates the operating condition of engine in which the engine 101 operates with intake air mass flow Q3 and the operating condition of engine in which the engine 101 operates at engine speed N3 and into the ON state from the OFF state for causing respectively the exhaust cutoff valve 111 and waste gate valve 117 to be open from closed in accordance with a line L4 which indicates the operating condition of engine in which the engine 101 operates with intake air mass flow Q4 and the operating condition of engine in which the engine 101 operates at engine speed N4, and the three-way solenoid valve 127 is changed into the OFF state from the ON state for causing the intake air cutoff valve 121 to be closed from open in accordance with a line L5 which indicates the operating condition of engine in which the engine 101 operates with intake air mass flow Q5 and the operating condition of engine in which the engine 101 operates at engine speed N5 and into the ON state from the OFF state for causing the intake air cutoff valve 121 to be open from closed in accordance with a line L6 which indicates the operating condition of engine in which the engine 101 operates with intake air mass flow Q6 and the operating condition of engine in which the engine 101 operates at engine speed N6.

On the characteristic chart of FIG. 4, an operating area having the line L4 as a lower boundary is set to correspond to the operating condition of the engine 101 in which intake air mass flow fed to the combustion chambers formed in the engine 101 is to be relatively large, and each of an operating area between the lines L2 and L4, and operating area having the line L2 as an upper boundary is set to correspond to the operating condition of the engine 101 in which intake air mass flow fed to the combustion chambers formed in the engine 101 is to be relatively small.

When the operating condition of the engine 101 resides in the operating area having the line L2 as an upper boundary, the control unit 135 is operative to keep each of the exhaust cutoff valves 111 and the intake air cutoff valve 121 closed and, contrary, the intake air relief valve 123 open, so that only the primary turbosupercharger 109 is caused to work for supercharging the engine 101. Then, when the intake air mass flow fed to the engine 101 has increased to cross the line L2 and the operating condition of the engine 101 has moved into the operating area between the lines L2 and L4, the control unit 135 is operative to close the intake air relief valve 123. In process of this, before the intake air relief valve 123 is closed, the exhaust bypass valve 113 is opened when the intake air mass flow fed to the engine 101 has increased to cross the line Le and thereby the exhaust gas is supplied slightly to the turbine Ts of the secondary turbosupercharger 110 through the exhaust bypass passage 114 under a condition in which the intake air relief valve 123 is open. This results in that the turbine Ts is driven to rotate by the exhaust gas flowing through the exhaust bypass passage 114 so that the secondary turbosupercharger 110 is subjected to its preliminary rotation before the exhaust cutoff valve 111 is opened.

After that, when the intake air mass flow in the engine 101 has further increased to cross the line L4 and the operating condition of the engine 101 has moved into the operating area between the lines L4 and L6, the control unit 135 is operative to open the exhaust cutoff valve 111, and then, when the intake air mass flow fed to the engine 101 has still further increased to cross the line L6 and the operating condition of the engine 101 has moved into the operating area having the line L6 as a lower boundary, the control unit 135 is operative to open the intake air cutoff valve 121, so that the turbine Tp of the primary turbosupercharger 109 and the turbine Ts of the secondary turbosupercharger 110 are driven to rotate by the exhaust gas passing through the first and second separated exhaust passages 102a and 102b respectively and thereby both the primary and secondary turbosuperchargers 109 and 110 are caused to work for supercharging the engine 101.

As described above, since the secondary turbosupercharger 110 is rotated preliminarily by the exhaust gas supplied thereto through the exhaust bypass valve 113 under the condition in which the intake air relief valve 123 is open before it commences to work for supercharging the engine 101 and the intake air relief valve 123 is closed before the exhaust cutoff valve 111 is opened, the secondary turbosupercharger 110 under the sufficiently high preliminary rotation commences to work for supercharging the engine 101, and consequently, the response in supercharging by the secondary turbosupercharger 110 is improved and torque shock arising on the engine 101 is surely suppressed when the secondary turbosupercharger 110 commences to work for supercharging the engine 101.

The control unit 135 is also operative to supply the three-way solenoid valve 133 with the control signal E4 so as to cause the three-way solenoid valve 133 to supply the diaphragm actuator 120 with the air pressure P1 obtained through the control pressure pipe 115 when the exhaust cutoff valve 111 is opened. Therefore, under a condition in which the operating condition of the engine 101 resides in the operating area having the line L6 as the lower boundary and therefore both the primary and secondary turbosuperchargers 109 and 110 work simultaneously for supercharging the engine 101, when the air pressure P1, that is, the compressed air pressure applied to the engine 101 reaches a predetermined value, the waste gate valve 117 is opened by the diaphragm valve 120 to cause a part of exhaust gas flowing through the first and second separated exhaust passages 102a and 102b to pass through the bypass passage 118 without passing through the turbines Tp and Ts of the primary and secondary turbosuperchargers 109 and 110 for preventing the compressed air pressure applied to the engine 101 from exceeding the predetermined value. That is, the waste gate valve 117 is operative to limit the compresses air pressure applied to the engine 101 to the predetermined value when both the primary and secondary turbosuperchargers 109 and 110 work for supercharging the engine 101.

On the other hand, under a condition in which only the primary turbosupercharger 109 works for supercharging the engine 101 and therefore the waste gate valve 117 is kept closed, when the intake air mass flow fed to the engine 101 has increased to cross the line Le shown in FIG. 4 and the air pressure P1 has reached the predetermined value, the exhaust bypass valve 113 is opened to cause the secondary turbosupercharger 110 to be subjected to its preliminary rotation. During the preliminary rotation of the secondary turbosupercharger 110, the compressed air pressure applied to the engine 101 is prevented from increasing substantially by the intake air relief passage 122 and the intake air relief valve 123 operative to open and close the intake air relief passage 122. That is, the intake air relief passage 122 and the intake air relief valve 123 work for making supercharging by the secondary turbosupercharger 110 substantially ineffective during the preliminary rotation of the secondary turbosupercharger 110. Accordingly, the exhaust bypass valve 113 functions to limit the compressed air pressure applied to the engine 101 to the predetermined value when only the primary turbosupercharger 109 works for supercharging the engine 101.

Figure 5:
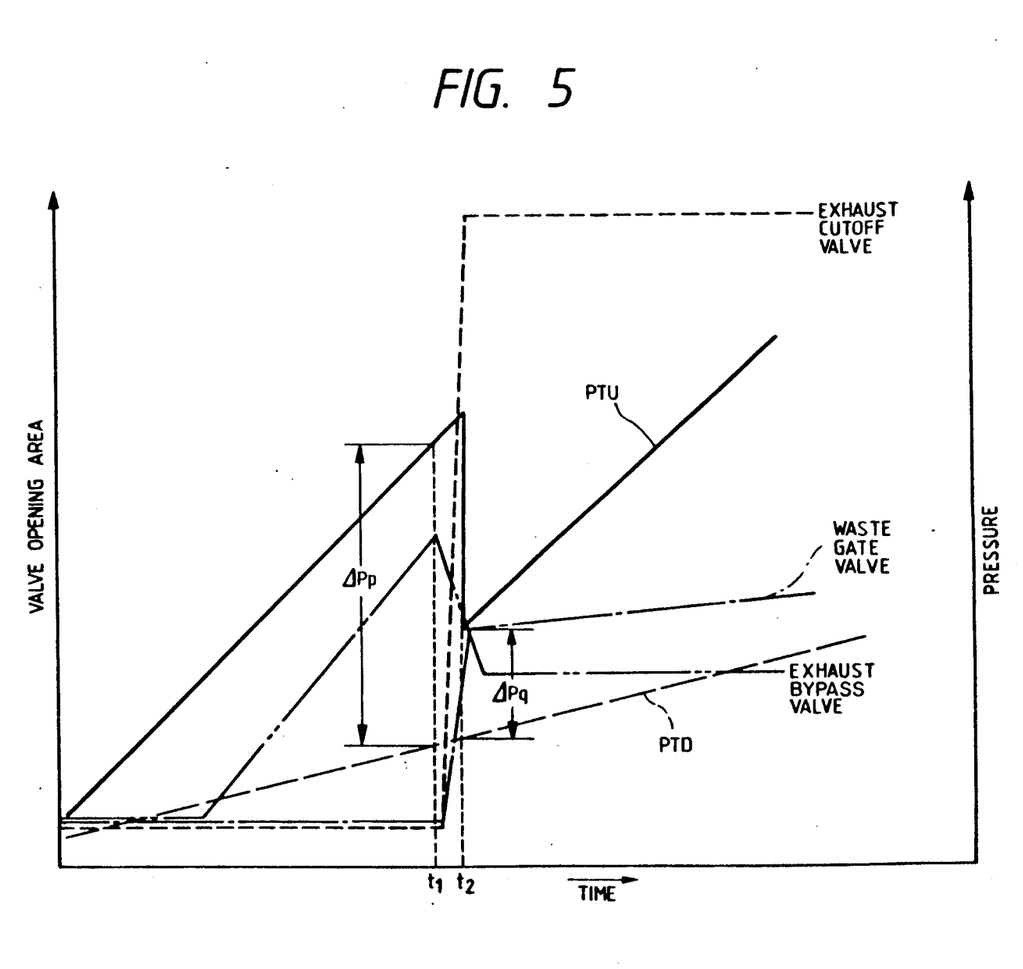

FIG. 5 is a characteristic chart showing operations of the exhaust cutoff valve 111, exhaust bypass valve 113 and waste gate valve 117 and variations in exhaust gas pressure. This characteristic chart of FIG. 5 has an axis of abscissa representing time, a first axis of ordinate representing valve opening area for the operations of the exhaust cutoff valve 111, exhaust bypass valve 113 and waste gate valve 117, and a second axis of ordinate representing pressure for variations in exhaust gas pressure at a position upstream to the turbine Tp in the first separated exhaust passage 102a, which is referred to as front exhaust gas pressure PTU and variations in exhaust gas pressure at a position downstream to the turbine Tp in the first separated exhaust passage 102a, which is referred to as rear exhaust gas pressure PTD.

According to the characteristic chart of FIG. 5, the exhaust cutoff valve 111, exhaust snifting valve 113 and waste gate valve 117 are closed when the intake air mass flow in the intake passage 103 is relatively small so that the secondary turbosupercharger 110 does not work and each of the front and rear exhaust gas pressures PTU and PTD is low. Then, with increase of the intake air mass flow in the intake passage 103, each of the front and rear exhaust gas pressures PTU and PTD increases and first the exhaust bypass valve 113 is opened to have its valve opening area increasing. After that, when the exhaust cutoff valve 111 is opened, the valve opening area of the exhaust bypass valve 113 decreases transitorily to be a predetermined constant value and then the waste gate valve 117 is opened. Further, immediately after the exhaust cutoff valve 111 is opened, the front exhaust gas pressure PTU decreases suddenly to reduce a difference between the front and rear exhaust gas pressures PTU and PTD, and thereafter increases again.

Figure 6:
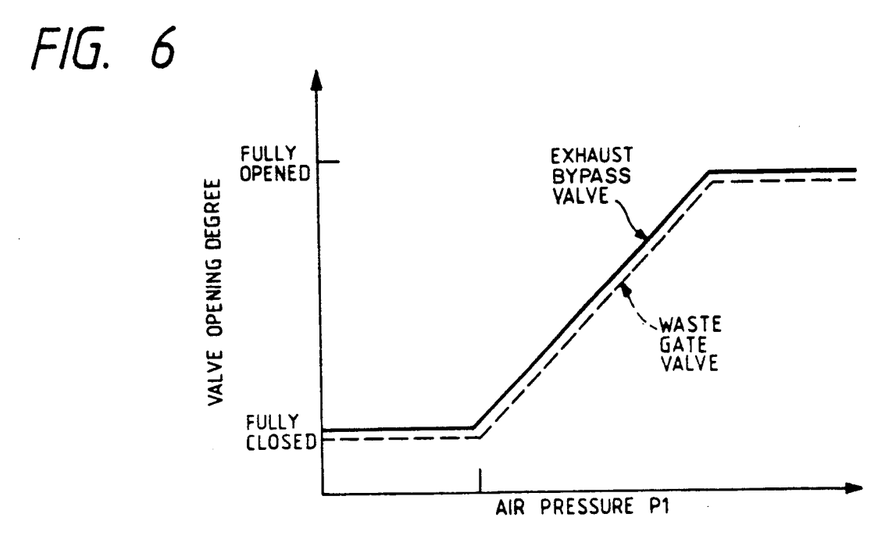

The exhaust bypass valve 113 and waste gate valve 117 are arranged to have the same operating characteristic in relation to the air pressure P1 at the position downstream to the compressor Cp in the first branched intake passage 103a in such a manner that each of the exhaust bypass valve 113 and waste gate valve 117 is changed to be open from closed and to be closed from open with the same value of the air pressure P1 and varies in valve opening degree in response to variations in the air pressure P1 in like manner, as shown in FIG. 6, so that the compressed air pressure applied to the engine 101 is properly limited to the same predetermined value by each of the exhaust bypass valve 113 and waste gate valve 117. For achieving this, each of the exhaust bypass valve 113 and waste gate valve 117 and each of the diaphragm actuators 116 and 120 driving the the exhaust bypass valve 113 and waste gate valve 117, respectively, which are constituted, for example, as shown in FIG. 7, are particularly designed as follows.

Figure 7:
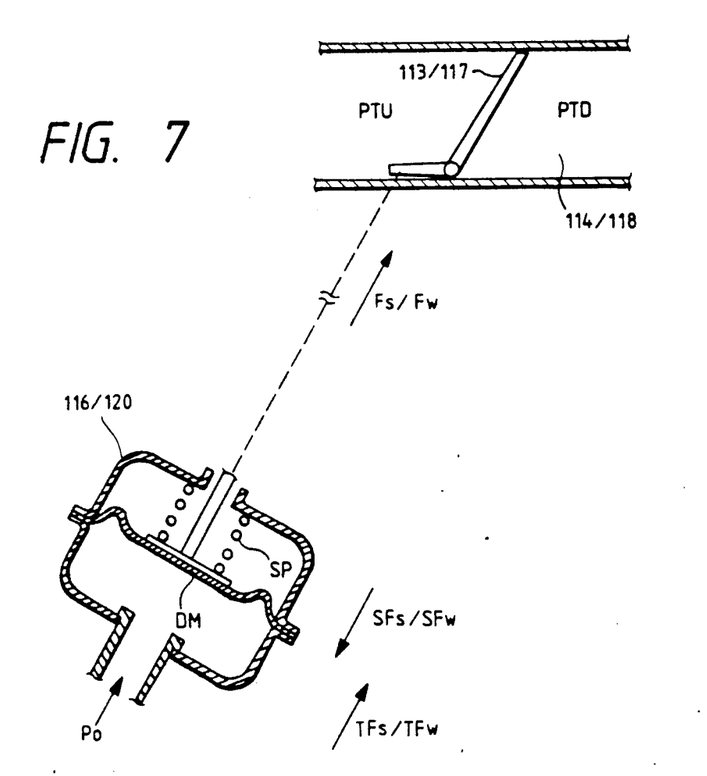
FIG. 7 is a schematic illustration used for explaining in detail each of an exhaust snifting valve and a waste gate valve employed in the embodiment shown in FIG. 2.

In the case of the exhaust bypass valve 113 and the diaphragm actuator 116 driving the exhaust bypass valve 113, since the front exhaust gas pressure PTU and rear exhaust gas pressure PTD are applied to the exhaust bypass valve 113 put in its closed state from the upstream and downstream sides, respectively, in the exhaust bypass passage 114, the following equations are to be satisfied for limiting the air pressure P1, that is, the compressed air pressure applied to the engine 101 to, for example, a maximum value Po.

$$SFs = TFs + Fs \qquad (1)$$
$$= Po \times As + (PTU - PTD)_{Pos} \times Ks$$
$$= Po \times As + \Delta Pp \times Ks$$

where SFs represents force effected to a diaphragm DM by a spring SP used in the diaphragm actuator 116 as shown in FIG. 7, TFs represents force effected to the diaphragm DM used in the diaphragm actuator 116 by the air pressure P1 having the maximum value Po as shown in FIG. 7, As represents the effective area of the diaphragm DM used for receiving the air pressure P1 as shown in FIG. 7, Fs represents force acting on the exhaust bypass valve 113 in such a manner as to open the same as shown in FIG. 7, $(PTU-PTD)_{Pos}$ or $\Delta Pp$ represents a pressure difference between the front and rear exhaust gas pressures PTU and PTD when the air pressure P1 has the maximum value Po, and Ks represents leverage of the exhaust bypass valve 113.

The force Fs varies in response to variations in the pressure difference $\Delta Pp$, and the pressure difference $\Delta Pp$ is obtained as a difference between the front exhaust gas pressure PTU and the rear exhaust gas pressure PTD at a time point $t_1$ immediately before the exhaust cutoff valve 111 is opened based on the characteristic chart of FIG. 5. Then, the diaphragm actuator 116 is designed to have the force SFs effected by the spring SP and the effective area. As of the diaphragm DM for receiving the air pressure P1 each satisfying the above equation (1), and the exhaust bypass valve 113 is designed to have the leverage Ks satisfying the above equation (1).

Further, in the case of the waste gate valve 117 and the diaphragm actuator 120 driving the waste gate valve 117, since the front exhaust gas pressure PTU and rear exhaust gas pressure PTD are applied to the waste gate valve 117 put in its closed state from the upstream and downstream sides, respectively, in the bypass passage 118, the following equations are to be satisfied for limiting the air pressure P1, that is, the compressed air pressure applied to the engine 101 also to the maximum value Po.

$$SFw = TFw + Fw \qquad (2)$$
$$= Po \times Aw + (PTU - PTD)_{Pow} \times Kw$$
$$= Po \times Aw + \Delta Pq \times Kw$$

where SFw represents force effected to a diaphragm DM by a spring SP used in the diaphragm actuator 120 as shown in FIG. 7, TFw represents force effected to the diaphragm DM used in the diaphragm actuator 120 by the air pressure P1 having the maximum value Po as shown in FIG. 7, Aw represents effective area of the diaphragm DM used for receiving the air pressure P1 in the diaphragm actuator 120 as shown in FIG. 7, Fw represents force acting on the exhaust bypass valve 113 in such a manner as to open the same as shown in FIG. 7, $(PTU-PTD)_{Pow}$ or $\Delta Pq$ represents a pressure difference between the front and rear exhaust gas pressures PTU and PTD when the air pressure P1 has the maximum value Po, and Kw represents leverage of the waste gate valve 117.

The force Fw varies in response to variations in the pressure difference $\Delta Pq$, and the pressure difference $\Delta Pq$ is obtained as a difference between the front exhaust gas pressure PTU and the rear exhaust gas pressure PTD at a time point $t_2$ immediately after the exhaust cutoff valve 111 is opened based on the characteristic chart of FIG. 5. Then, the diaphragm actuator 120 is designed to have the force SFw effected by the spring SP and the effective area Aw of the diaphragm DM for receiving the air pressure P1 each satisfying the above equation (2), and the waste gate valve 117 is designed to have the leverage Kw satisfying the above equation (2).

The control unit 135 is further operative to supply the solenoid valve 144 with the control signal E5 so as to cause the opening 145 to vary in response to the operating condition of the engine 101, such as the engine speed. With such control to the opening 145, the maximum value of the compressed air pressure applied to engine 101 to which the compressed air pressure is limited by the exhaust bypass valve 113 or the waste gate valve 117 is adjusted in response to the operating condition of the engine 101.

Figure 8:
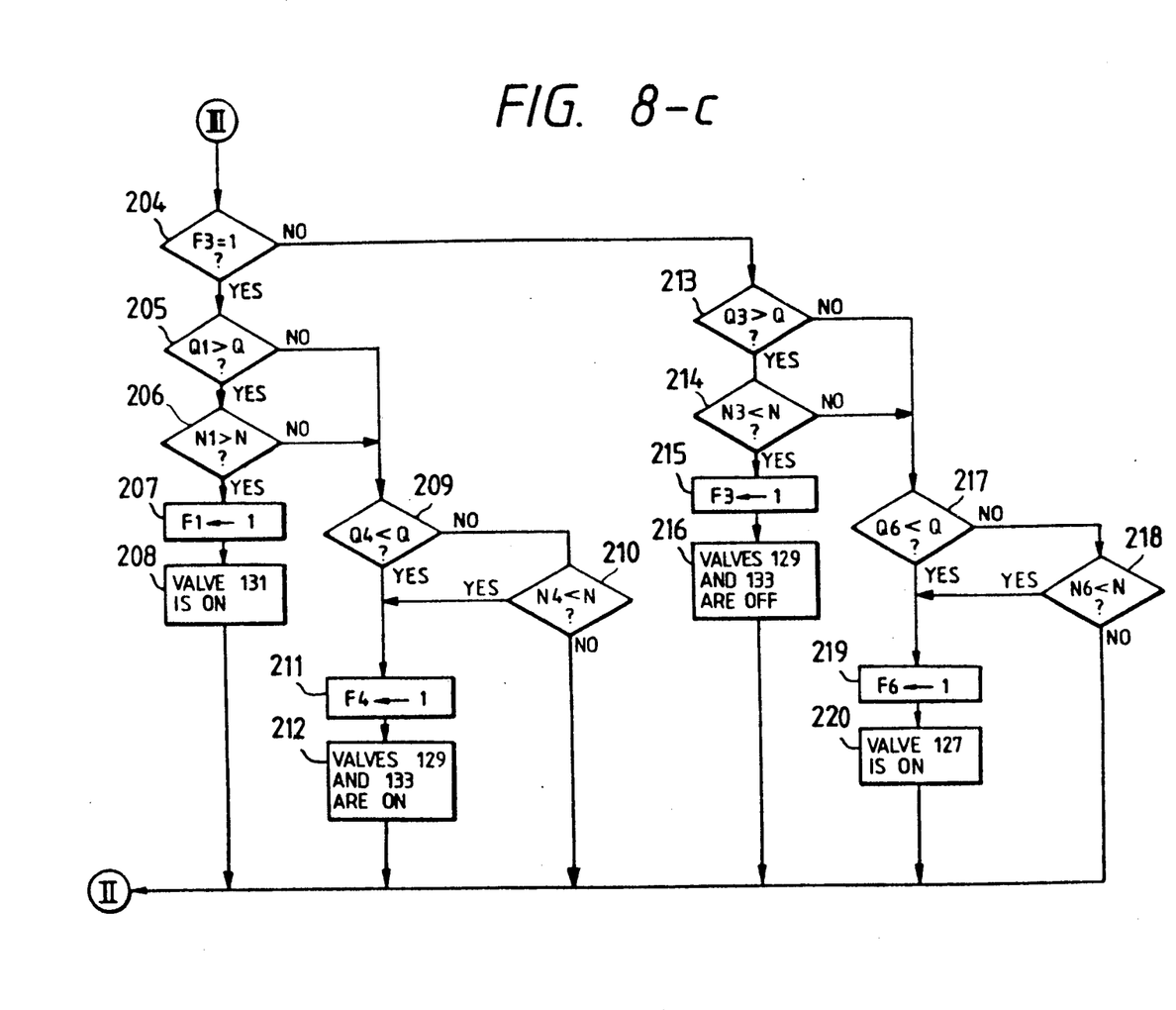
Figure 8A:
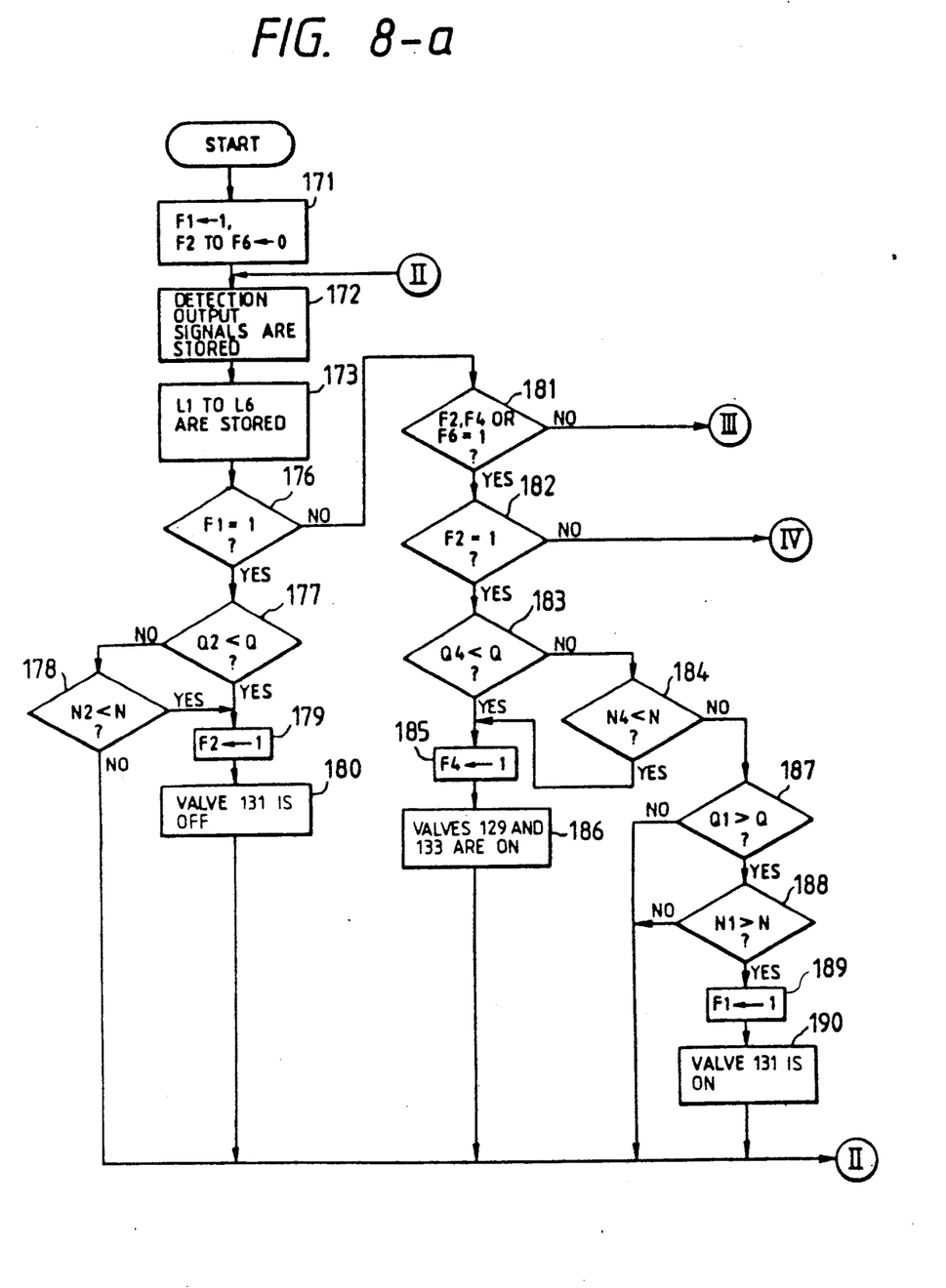
Figure 8B:
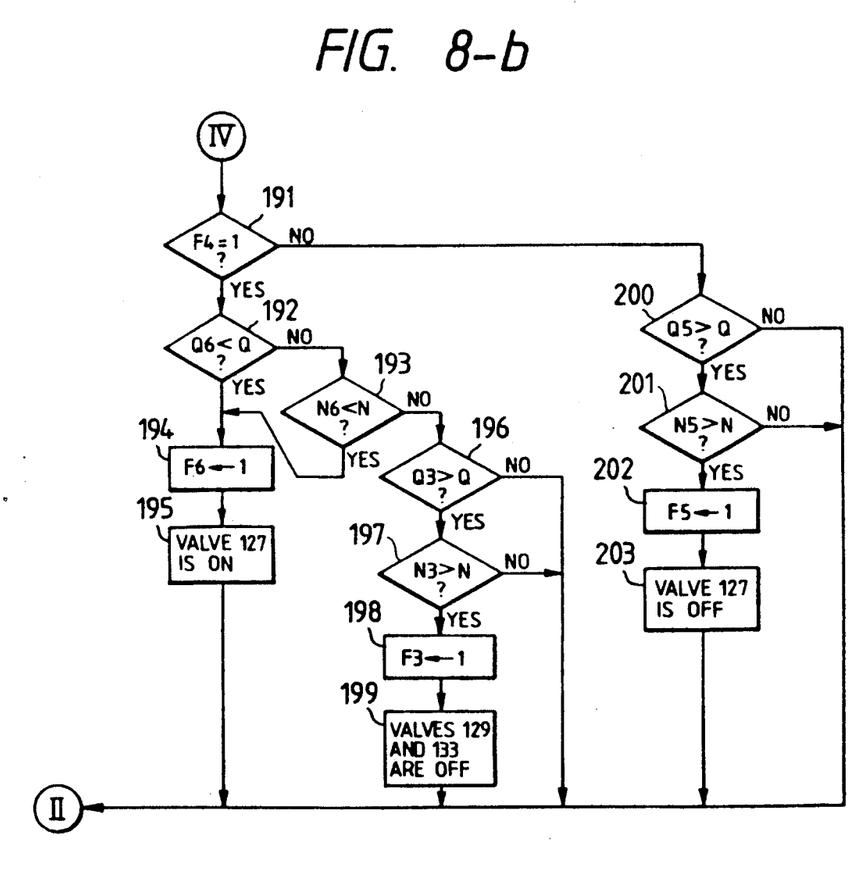

One example of an operation program for controlling the three-way solenoid valves 129, 133, 127 and 131 for actuating the exhaust cutoff valve 111, waste gate valve 117, intake air cutoff valve 121 and intake air relief valve 123, respectively, is carried out in the control unit 135 in accordance with a flow chart shown in FIGS. 8-a, 8-b and 8-c.

According to the flow chart shown in FIGS. 8-a, 8-b and 8-c, first, in step 171, an initial arrangement for setting a flag F1 to be 1 and setting each of flags F2 to F6 to be 0 is conducted. As shown in FIG. 4, after the initial arrangement, the flag F1 is set to be 1 and each of the flags F2 to F6 is set to be 0 when the intake air mass flow or the engine speed is decreased to cross the line L1 the flag F2 is set to be 1 and each of the flags F1 and F3 to F6 is set to be 0 when the intake air mass flow or the engine speed is increased to cross the line L2, the flag F3 is set to be 1 and each of the flags F1, F2 and F4 to F6 is set to be 0 when the intake air mass flow or the engine speed is decreased to cross the line L3, the flag F4 is set to be 1 and each of the flags F1 to F3, F5 and F6 is set to be 0 when the intake air mass flow or the engine speed is increased to cross the line L4, the flag F5 is set to be 1 and each of the flags F1 to F4 and F6 is set to be 0 when the intake air mass flow or the engine speed is decreased to cross the line L5, and the flag F6 is set to be 1 and each of the flags F1 to F5 is set to be 0 when the intake air mass flow or the engine speed is increased to cross the line L6.

Then, in step 172, the detection output signals Sa, Sn, St and Sp1 obtained from the sensors 104, 161, 162 and 163 are stored. Further, the intake air mass flow Q1 and the engine speed N1 representing the line L1, the intake air mass flow Q2 and the engine speed N2 representing the line L2, the intake air mass flow Q3 and the engine speed N3 representing the line L3, the intake air mass flow Q4 and the engine speed N4 representing the line L4, the intake air mass flow Q5 and the engine speed N5 representing the line L5, and the intake air mass flow Q6 and the engine speed N6 representing the line L6 are stored, in step 173.

After that, in step 176, it is checked whether the flag F1 is 1 or not. When the flag F1 is 1, it is checked whether the intake air mass flow Q is larger then the intake air mass flow Q2 or not, in step 177. If the intake air mass flow Q is equal to or smaller than the intake air mass flow Q2, it is checked whether engine speed N represented by the detection output signal Sn is higher than the engine speed N2 or not, in step 178.

When it is clarified in the step 177 that the intake air mass flow Q is larger than the intake air mass flow Q2 or it is clarified in the step 178 that the engine sped N is higher than the engine speed N2, the flag F2 is set to be 1 in step 179, and the control signal E2 is supplied to the three-way solenoid valve 131 so that the three-way solenoid valve 131 is put in the OFF state for causing the intake air relief valve to be closed, in step 180, then the process returns to the step 172. On the other hand, the engine speed N is equal to or lower than the engine speed N2 as a result of the check in the step 178, the process returns to the step 172 directly from the step 178.

If it is clarified in the step 176 that the flag F1 is 0, it is checked whether the flag F2, F4 or F6 is 1 or not in step 181. When the flag F2, F4 or F6 is 1, it is further checked whether the flag F2 is 1 or not in step 182. Then, if the flag F2 is 1, it is checked whether the intake air mass flow Q is larger then the intake air mass flow Q4 or not, in step 183. If the intake air mass flow Q is equal to or smaller than the intake air mass flow Q4, it is checked whether the engine speed N is higher than the engine speed N4 or not, in step 184.

When it is clarified in the step 183 that the intake air mass flow Q is larger than the intake air mass flow Q4 or it is clarified in the step 184 that the engine speed N is higher than the engine speed N4, the flag F4 is set to be 1 in step 185, and the control signals E3 and E4 are supplied to the three-way solenoid valves 129 and 133 respectively so that the three-way solenoid valves 129 and 133 are put in the ON state for causing respectively the exhaust cutoff valve 111 and waste gate valve 117 to be open, in step 186, then the process returns to the step 172.

On the other hand, the engine speed N is equal to or lower than the engine speed N4 as a result of the check in the step 184, it is checked whether the intake air mass flow Q is smaller than the intake air mass flow Q1 or not, in step 187. If the intake air mass flow Q is smaller than the intake air mass flow Q1, it is further checked that the engine speed N is lower than the engine speed N1 or not, in step 188. When it is clarified in the step 187 that the intake air mass flow Q is equal to or larger than the intake air mass flow Q1 or it is clarified in the step 188 that the engine speed N is equal to or higher than the engine speed N1, the process returns to the step 172. On the other hand, if the engine speed N is lower than the engine speed N1 as a result of the check in the step 188, the flag F1 is set to be 1 in step 189, and the control signal E2 is supplied to the three-way solenoid valve 131 so that the three-way solenoid valve 131 is put in the ON state for causing the intake air relief valve 123 to be open, in step 190, then the process returns to the step 172.

When it is clarified in the step 182 that the flag F2 is 0, it is checked whether the flag F4 is 1 or not in step 191. Then, if the flag F4 is 1, it is checked it is checked whether the intake air mass flow Q is larger then the intake air mass flow Q6 or not, in step 192. If the intake air mass flow Q is equal to or smaller than the intake air mass flow Q6, it is checked whether the engine speed N is higher than the engine speed N6 or not, in step 193.

When it is clarified in the step 192 that the intake air mass flow Q is larger than the intake air mass flow Q6 or it is clarified in the step 193 that the engine speed N is higher than the engine speed N6, the flag F6 is set to be 1 in step 194, and the control signal E1 is supplied to the three-way solenoid valve 127 so that the three-way solenoid valve 127 is put in the ON state for causing the intake air cutoff valve 121 to be open, in step 195, then the process returns to the step 172. To the contrary, the engine speed N is equal to or lower than the engine speed N6 as a result of the check in the step 193, it is checked whether the intake air mass flow Q is smaller than the intake air mass flow Q3 or not, in step 196. If the intake air mass flow Q is smaller than the intake air mass flow Q3, it is further checked that the engine speed N is lower than the engine speed N3 or not, in step 197. When it is clarified in the step 196 that the intake air mass flow Q is equal to or larger than the intake air mass flow Q3 or it is clarified in the step 197 that the engine speed N is equal to or higher than the engine speed N3, the process returns to the step 172.

On the other hand, if the engine speed N is lower than the engine speed N3 as a result of the check in the step 197, the flag F3 is set to be 1 in step 198, and the control signals E3 and E4 are supplied to the three-way solenoid valves 129 and 133 respectively so that the three-way solenoid valves 129 and 133 are put in the OFF state for causing respectively the exhaust cutoff valve 111 and waste gate valve 117 to be closed, in step 199, then the process returns to the step 172.

If it is clarified in the step 191 that the flag F4 is 0, it is checked whether the intake air mass flow Q is smaller than the intake air mass flow Q5 or not, in step 200. If the intake air mass flow Q is smaller than the intake air mass flow Q5, it is further checked that the engine speed N is lower than the engine speed N5 or not, in step 201. When it is clarified in the step 200 that the intake air mass flow Q is equal to or larger than the intake air mass flow Q5 or it is clarified in the step 201 that the engine speed N is equal to or higher than the engine speed N5, the process returns to the step 172. On the other hand, the engine speed N is lower than the engine speed N5 as a result of the check in the step 201, the flag F5 is set to be 1 in step 202, and the control signal E1 is supplied to the three-way solenoid valve 127 so that the three-way solenoid valve 127 is put in the OFF state for causing the intake air cutoff valve 121 to be closed, in step 203, then the process returns to the step 172.

Further, when it is clarified in the step 181 that none of the flags F2, F4 and F6 is 1, it is checked whether the flag F3 is 1 or not in step 204. Then, if the flag F3 is 1, it is checked whether the intake air mass flow Q is smaller than the intake air mass flow Q1 or not, in step 205. If the intake air mass flow Q is smaller than the intake air mass flow Q1, it is further checked that the engine speed N is lower than the engine speed N1 or not, in step 206. If the engine speed N is lower than the engine speed N1 as a result of the check in the step 206, the flag F1 is set to be 1 in step 207, and the control signal E2 is supplied to the three-way solenoid valve 131 so that the three-way solenoid valve 131 is put in the ON state for causing the intake air relief valve 123 to be open, in step 208, then the process returns to the step 172.

When it is clarified in the step 205 that the intake air mass flow Q is equal to or larger than the intake air mass flow Q1 or it is clarified in the step 206 that the engine speed N is equal to or higher than the engine speed N1, it is checked whether the intake air mass flow Q is larger then the intake air mass flow Q4 or not, in step 209. If the intake air mass flow Q is equal to or smaller than the intake air mass flow Q4, it is checked whether the engine speed N is higher than the engine speed N4 or not, in step 210.

If the engine speed N is equal to or lower than the engine speed N4 as a result of the check in the step 210, the process returns to the step 172. On the other hand, if it is clarified in the step 209 that the intake air mass flow Q is larger than the intake air mass flow Q4 or it is clarified in the step 210 that the engine speed N is higher than the engine speed N4, the flag F4 is set to be 1 in step 211, and the control signals E3 and E4 are supplied to the three-way solenoid valves 129 and 133 respectively so that the three-way solenoid valves 129 and 133 are put in the ON state for causing respectively the exhaust cutoff valve 111 and waste gate valve 117 to be open, in step 212, then the process returns to the step 172.

When it is clarified in the step 204 that the flag F3 is 0 it is checked whether the intake air mass flow Q is smaller than the intake air mass flow Q3 or not, in step 213. If the intake air mass flow Q is smaller than the intake air mass flow Q3, it is further checked that the engine speed N is lower than the engine speed N3 or not, in step 214. If the engine speed N is lower than the engine speed N3 as a result of the check in the step 214, the flag F3 is set to be 1 in step 215, and the control signals E3 and E4 are supplied to the three-way solenoid valves 129 and 133 respectively so that the three-way solenoid valves 129 and 133 are put in the OFF state for causing respectively the exhaust cutoff valve 111 and waste gate valve 117 to be closed, in step 216, then the process returns to the step 172.

When it is clarified in the step 213 that the intake air mass flow Q is equal to or larger than the intake air mass flow Q3 or it is clarified in the step 214 that the engine speed N is equal to or higher than the engine speed N3, it is checked whether the intake air mass flow Q is larger then the intake air mass flow Q6 or not, in step 217. If the intake air mass flow Q is equal to or smaller than the intake air mass flow Q6, it is checked whether the engine speed N is higher than the engine speed N6 or not, in step 218.

If the engine speed N is equal to or lower than the engine speed N6 as a result of the check in the step 218, the process returns to the step 172. On the other hand, if it is clarified in the step 217 that the intake air mass flow Q is larger than the intake air mass flow Q6 or it is clarified in the step 218 that the engine sped N is higher than the engine speed N6, the flag F6 is set to be 1 in step 219, and the control signal E1 is supplied to the three-way solenoid valve 127 so that the three-way solenoid valve 127 is put in the ON state for causing the intake air cutoff valve 121 to be open, in step 220, then the process returns to the step 172.

What is claimed is :

1. An air supply control system for an internal combustion engine comprising:

a first turbosupercharger having a turbine disposed in a first separated exhaust passage extending from the engine and a compressor disposed in a first separated intake passage connected to the engine, a second turbosupercharger having a turbine disposed in a second separated exhaust passage extending from the engine and a compressor disposed in a second separated intake passage connected to the engine, an exhaust cutoff valve operative selectively to be open and closed respectively for opening and closing the second separated exhaust passage, first valve driving means operative to cause the exhaust cutoff valve to be closed so that the first turbosupercharger works for supercharging the engine but the second turbosupercharger is restrained from supercharging the engine when intake air mass flow fed to the engine is relatively small and to cause the exhaust cutoff valve to be open so that both of the first and second turbosuperchargers work for supercharging the engine when the intake air mass flow red to the engine is relatively large, an exhaust bypass valve operative selectively to be open and closed respectively for opening and closing an exhaust bypass passage provided to the second separated exhaust passage for forming a first partial exhaust passage detouring the exhaust cutoff valve, second valve driving means operative to cause the exhaust bypass valve to be open so that a relatively small exhaust gas flow is supplied through the exhaust bypass passage to the turbine of the second turbosupercharger when pressure of intake air applied to the engine reaches a predetermined value under a condition in which the intake air mass flow fed to the engine is to be relatively small, a waste gate valve operative selectively to be open and closed respectively for opening and closing a bypass passage provided in common to the first and second separated exhaust passages for forming a second partial exhaust passage detouring the turbines of the first and second turbosuperchargers, and third valve driving means operative to cause the waste gate valve to be open so that a part of exhaust gas from the engine flows through the bypass passage without passing through the turbines of the first and second turbosuperchargers to prevent the pressure of intake air applied to the engine from increasing when the pressure of intake air applied to the engine reaches substantially the predetermined value under a condition in which the intake air mass flow fed to the engine is to be relatively large.

2. An air supply control system according to claim 1 further comprising intake air control means operative to make supercharging by the second turbosupercharger substantially ineffective when said exhaust cutoff valve is closed and said exhaust bypass valve is open.

3. An air supply control system according to claim 2, wherein said intake air control means comprises a relief passage provided to the second separated intake passage for detouring the compressor of the second turbosupercharger and an intake air relief valve operative selectively to be open and closed respectively for opening and closing the relief passage.

4. An air supply control system according to claim 1, wherein said second valve driving means comprises a diaphragm actuator having a pressure chamber which contains a spring for biasing said exhaust bypass valve to be closed and a control pressure passage for applying air pressure at a position downstream to the compressor of the first turbosupercharger in the first separated intake passage to the pressure chamber of said diaphragm actuator.

5. An air supply control system according to claim 1, wherein said third valve driving means comprises a diaphragm actuator having a pressure chamber which contains a spring for biasing said waste gate valve to be closed, a control pressure passage for applying air pressure at a position downstream to the compressor of the first turbosupercharger in the first separated intake passage to the pressure chamber of said diaphragm actuator, and a solenoid valve operative to introduce atmospheric pressure into the pressure chamber of said diaphragm actuator under the condition in which the intake air mass flow fed to the engine is to be relatively small.

6. An air supply control system according to claim 1, wherein said exhaust bypass valve and said second valve driving means are constituted so that said exhaust bypass valve is opened by force varying in response to variations in a difference between first exhaust gas pressure which is obtained at a position upstream to said exhaust bypass valve in said exhaust bypass passage when said exhaust bypass valve is closed and second exhaust gas pressure which is obtained at a position downstream to said exhaust bypass valve in said exhaust bypass passage when said exhaust bypass valve is closed, and said waste gate valve and said third valve driving means are constituted so that said waste gate valve is opened by force varying in response to variations in a difference between third exhaust gas pressure which is obtained at a position upstream to said waste gate valve in said bypass passage when said waste gate valve is closed and fourth exhaust gas pressure which is obtained at a position downstream to said waste gate valve in said bypass passage when said waste gate valve is closed.

7. An air supply control system according to claim 6, wherein each of said first and third exhaust gas pressures tends to increase in accordance with increase of the intake air mass flow fed to the engine and to decrease transitorily when said exhaust cutoff valve is changed to be open from closed.

* * * * *